US008690966B2

(12) United States Patent
DeVall

(10) Patent No.: US 8,690,966 B2
(45) Date of Patent: Apr. 8, 2014

(54) TOBACCO PLANT DERIVED DYE AND PROCESS OF MAKING THE SAME

(75) Inventor: Suzanne M. DeVall, Bainbridge Island, WA (US)

(73) Assignee: PBO, Inc., Carson City, NV (US)

(*) Notice: Subject to any disclaimer, the term of this patent is extended or adjusted under 35 U.S.C. 154(b) by 0 days.

(21) Appl. No.: 13/460,820

(22) Filed: Apr. 30, 2012

(65) Prior Publication Data

US 2012/0272460 A1 Nov. 1, 2012

Related U.S. Application Data

(63) Continuation-in-part of application No. 12/783,503, filed on May 19, 2010.

(51) Int. Cl.
| | |
|---|---|
| *C09B 61/00* | (2006.01) |
| *C09B 67/04* | (2006.01) |
| *C09B 67/44* | (2006.01) |
| *C09B 67/54* | (2006.01) |

(52) U.S. Cl.
USPC .................................. 8/438; 8/401; 8/636

(58) Field of Classification Search
USPC ..................... 8/438, 550, 401, 636
See application file for complete search history.

(56) References Cited

U.S. PATENT DOCUMENTS

| | | | | | |
|---|---|---|---|---|---|
| 3,240,214 | A | * | 3/1966 | Bavley et al. ................. | 131/308 |
| 3,415,253 | A | * | 12/1968 | Michels et al. ............... | 131/373 |
| 3,513,857 | A | * | 5/1970 | Silberman ..................... | 131/293 |
| 4,991,599 | A | * | 2/1991 | Tibbetts ........................ | 131/297 |
| 5,899,784 | A | | 5/1999 | Tri et al. | |
| 2009/0080285 | A1 | * | 3/2009 | Brotz et al. ................... | 366/272 |
| 2011/0287681 | A1 | * | 11/2011 | Devall .......................... | 442/415 |

OTHER PUBLICATIONS

Derwent abstract 2008-D02816 (2009).*
Oosthuizen et al. The Enzymes of the Tobacco Plant, Jun. 12, 1913.*
Filters and Filtration Handbook, fifth edition 2008.*

* cited by examiner

*Primary Examiner* — Lorna M Douyon
*Assistant Examiner* — Amina Khan
(74) *Attorney, Agent, or Firm* — Richard A. Ryan

(57) ABSTRACT

A dye produced from tobacco plant materials selected from tobacco plants are described and a process for making the dye from the tobacco plants. In a preferred embodiment, the tobacco plants are organically grown and the stems and leaves of the plants are utilized to produce the dye. In one embodiment, the process percolates a hot liquid solution onto the plant materials to produce tobacco plant fiber and the dye. In the preferred embodiment, the process includes the steps of grinding the plant materials, adding treated water to form a solution, adding plant enzymes, heating the solution for set periods of time and selectively adjusting the pH level of the solution. The dye can be produced in many colors and does not require a mordant to bind. The process does not produce waste. The process expands the use of tobacco plants, minimizes environmental impacts and requires less material, fuel and other resources.

5 Claims, 4 Drawing Sheets

TOBACCO PLANT DERIVED DYE AND PROCESS OF MAKING THE SAME

CROSS-REFERENCE TO RELATED APPLICATIONS

This patent application is a continuation-in-part of U.S. patent application Ser. No. 12/783,503 filed May 19, 2010, currently pending.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The present invention relates generally to plant-based dyes and processes for making such dyes. In particular, the present invention relates to dyes made from tobacco plant materials and processes for making such dyes. Even more particularly, the present invention relates to such processes that are utilized to produce dyes from tobacco plants in an environmentally-friendly and efficient manner.

B. Background

Plant fiber materials have been utilized for many years to produce textile from which a wide variety of fabrics can be manufactured. In particular, it has been known for many years that the bast fibers of various plants, including hemp, flax, jute, nettle, ramie and the like, can be utilized for a wide variety of different textiles. The bast fibers grow on the outside of the woody core of the plant's stalk, referred to as the xylem, and under the outer most part of the plant (e.g., the bark). These fibers give the plant strength and support the conductive cells of the phloem, the layer of the plant just under the bast fibers and in which the valuable fibers are located. The bast fibers of the typical plant are attached to the wood core fibers by the combination of pectin, a glue-like substance, and calcium ions. In order to beneficially use the bast fibers, however, they must be separated from the rest of the stalk. Typically, the separation of the bast fibers from the woody core is accomplished utilizing a procedure commonly referred to as retting, which is a process of rotting away the inner plant stalk to leave the outer bast fibers intact. Retting is accomplished by micro-organisms either on land or in the water or by using chemicals or pectinolytic enzymes.

The most common method of retting comprises placing the plant material to be retted in a pond, stream, field or tank and exposing the material to water for a sufficient amount of time to allow the water to penetrate the central stalk portion, swell the inner cells and burst the outermost layer, thereby exposing the inner core to decay-producing bacteria that will rot away the inner stalk and leave the outer fibers intact, a procedure known as decortification. As well known in the art, the retting process results in several environmental issues, primarily the production of chemical compounds that can cause pollution if the waste water is not properly treated and odors. Although pond and stream retting, which requires the plant material to be submerged in the pond or stream, tend to be the fastest methods of retting they also tend to produce the most pollution. Field retting, which involves laying the plant material out in a large field and allowing dew to collect on it, takes considerably more time but tends to produce less pollution. Tank retting typically provides greater control over the process, in which concrete vats or the like are commonly utilized as the tank, but it also produces significant toxic elements in the waste water that must be treated prior to being released to the environment. In some processes, sulphur and other toxic chemicals are introduced into the system to speed up and more effectively accomplish the process of separating the bast fibers from the wood core of the plant stalk.

As well known by those familiar with textiles (as well as many other products), there has been an increase in demand for products that are made from natural materials and for products that are produced in a more environmentally friendly or "green" manner so as to reduce negative impacts on the environment. Products which are both made from natural products and in an environmentally friendly manner are particularly desired. With regard to plants, whether utilized for their fiber or as a food source, there has been a significant increase in the demand for naturally or organically grown products. One common feature of producing such products is that they are grown with no or at least a significantly reduced amount of chemical fertilizers, pesticides and other products. Many consumers desire organically grown products because they substantially lessen the likelihood of pollutants from runoff and groundwater penetration, significantly reduce the overall "carbon footprint" by not requiring the production, delivery and application of chemicals to the land and/or plants and do not place dangerous and potentially harmful chemicals into the food chain. The use of natural plant materials for textiles has benefited generally from the increase in the desire for natural products. Unfortunately, although the use of natural plant materials for textiles does have the benefit of being organic, including being able to be grown under organic conditions, the retting process of treating the plants to separate the desirable bast fibers for use to make the textiles is not generally considered to be organic or environmentally friendly.

One plant which has not been heretofore utilized for the production of textiles is the tobacco plant, which are plants in the genus *Nicotiana*. There are many species of tobacco plants that fall within the genus of herbs *Nicotiana*, all of which are collectively referred to as tobacco plants. Although the leaf of the tobacco plant has a long history of use in the United States and elsewhere for smoking, chewing and snuff tobacco products, it is believed that the plant fibers have never been utilized to form textiles or any textile-related products, perhaps due in part to the high value of the leaf of the plant for use in the manufacture of tobacco products. The leaves of the tobacco plant are also utilized as an organic pesticide and in some medicines. Unlike such plants as hemp and nettle, where it is primarily the stalk of the plant that is commercially beneficial (except for some use of the leaves as a tea or food item), the tobacco plant is primarily only grown for its leaves. For consumption as cigarettes and other smoking products, the tobacco plants are often fertilized with the mineral apatite to starve the plant of nitrogen and produce a more desired flavor. The mineral apatite, however, contains radium, lead and other compounds that are known to be radioactive carcinogens. After the leaves are harvested from the tobacco plant, they are cured and aged to allow for the slow oxidation and degradation of the carotenoid in the tobacco leaf. The production of tobacco plants for tobacco products are known to require the use of a relatively large amount of fertilizers and pesticides, which frequently end up in waterways and the food chain. The typical curing process requires a large amount of fuel, typically petroleum, coal and natural gas. Many areas of the world that do not have sufficient access to these fuel sources utilize a large amount of wood for the curing of the tobacco leaves, which is known to be a contributing factor to deforestation.

The use of tobacco, particularly in the form of cigarettes and other smoking products, is known to cause a variety of health issues, including cancer, that can lead to death. As a result of the health issues associated with use of tobacco products, the availability of such products is limited to persons over the age of eighteen in the United States. In addition, many government and other organizations actively and strongly encourage people to quit using such tobacco products through public service announcements and the imposition of taxes that are directed solely at tobacco products. Smoking and other uses of tobacco are banned in most public and work places. Due to the various negative health, cost, convenience and other issues related to the use of tobacco products, their use has significantly decreased over the years. This decrease in use is anticipated to continue over time. As a result, there is likely to be excess production capacity for tobacco plants that will allow its economical use as a natural textiles, dyes and other products. Presently, however, there is no known process for converting the otherwise harmful tobacco plant into a textile, dye or other useful product that is efficient, economical and environmentally-friendly.

Dyes for changing the color of fibers and the like are known to have been in use for many thousands of years. Dyes can be made from a variety of sources, including animal, plant and mineral materials. The most common form of dyes originate naturally as plants, typically the berries, roots, bark, leaves and wood portions thereof. Natural dyes are also known to be made from fungi and lichens. Although dyes were commonly made from these and other natural products, currently dyes are generally synthetically produced from a wide variety of different chemicals. In fact, from a commercial standpoint, natural dyes are rarely produced in large-scale quantities. When produced, natural dyes require the use of a mordant to improve the fastness of the dye and to protect against color degradation due to water, light and perspiration. As well known, mordants are utilized to set a dye on a fibers, fabrics and other materials and accomplish this objective by forming a coordination complex with the dye that then attaches to the material to be dyed. One concern with regard to mordants is that the selection of a mordant for a particular coloring use is critical, as the final color of the material to be dyed can be highly affected by the choice of the mordant. In addition, most mordants contain heavy metals, which are known to be hazardous to persons and harmful to the environment if the mordant is not properly stored, handled or disposed. In light of the problems associated with mordants, there is a desire for a natural dye that can be readily, efficiently and relatively cheaply produced and which can be utilized without a mordant.

What is needed, therefore, is a dye that is made from tobacco plant materials and a process for efficiently and effectively transforming these materials into dyes and other useful products. Preferably, the dye should be made from one or more components of the tobacco plant. The preferred process for making a tobacco-based dye should be adaptable for utilizing organically grown tobacco plants and be able to produce dyes and other useful products from such plants in an efficient, economical and environmentally-friendly manner. Preferably, the process for making dye from tobacco plants should be selected so as to not contaminate the environment and/or not result in health problems for those utilizing the process.

SUMMARY OF THE INVENTION

The dye and process for making dye from tobacco plants of the present invention provides the benefits and solves the problems identified above. That is to say, the present invention discloses a new dye which is made from tobacco plants and a process of utilizing tobacco plants to produce such a dye. The dye and process of making the dye of the present invention utilize organically raised tobacco plants and, as a result, effectively encourages organically raised tobacco plants. The textile is made, in whole or part, from fibers derived from tobacco plants. The process of the present invention transforms tobacco plants into dyes and a variety of other products in an efficient, economical and generally environmentally-friendly manner. The process of the present invention allows use of a plant that is primarily only utilized presently to produce harmful tobacco products and encourages use of that plant for dyes, textiles, essential oils and other non-harmful products. As such, the process of the present invention will provide a significant new use for what is generally considered a plant that is seen as having an increasingly diminishing use. In one embodiment, the process of utilizing tobacco plants of the present invention will utilize all portions of the tobacco plant. In another embodiment, the leaves and the stem of a tobacco plant are utilized to make a dye that can be utilized with all types of textiles and fabrics, including tobacco plant derived textiles and fabrics.

In one embodiment of the present invention, a new textile is made from tobacco plant fiber, which is derived from tobacco plants. In a preferred configuration of this embodiment, the tobacco plants are organically grown to reduce or eliminate the use and introduction of chemicals into the environment and to reduce the amount of energy and water required to grow, harvest and process the tobacco plants. The tobacco plant fiber is manufactured to form a fabric that can be used for clothing, coverings, bags and many other uses. If desired, the tobacco plant fiber can be mixed with secondary material fibers that comprise natural fibers, such as those from animals, plants or minerals and/or synthetic fibers, such as those that are derived from petroleum or other materials, to form the textile and achieve certain desired properties for the textile. In the preferred embodiment, the tobacco plant fiber is derived from the tobacco plants by treating tobacco plant material with a heated liquid solution, preferably by percolating the solution onto the tobacco plant material. The textile can be dyed with a dye that is derived from the tobacco plants while producing the tobacco plant fiber.

The process of deriving a tobacco plant fiber from one or more tobacco plants of one embodiment generally comprises the steps of obtaining tobacco plant materials from the tobacco plants and treating the tobacco plant materials in a treating system to transform the tobacco plant material into the desired tobacco plant fiber. In a preferred embodiment, the tobacco plants are organically grown and the process utilizes substantially the entire tobacco plant to produce the tobacco plant fiber. Preferably, the treating system is a closed-loop system to eliminate discharge or release of material to the environment and to reduce the amount of materials and energy needed to transform the tobacco plant materials to tobacco plant fiber. The preferred treating system percolates a hot liquid solution, comprising water, ammonia-dioxide and sulphur-dioxide, onto the tobacco plant materials and allows the tobacco plant materials to essentially stew in their own juice to breakdown the plant material into the desired tobacco plant fiber. Percolating the hot liquid solution onto the tobacco plant materials produces steam, which is condensed and directed back into the treating system. Liquid from the treating system and from dewatering the pulp produced by the treating system is utilized as a natural dye for coloring the tobacco plant based textile or other textiles.

In the primary embodiment of the present invention, a dye is made from selected tobacco plant materials, namely the leaves and stems of tobacco plants. The process 50 of the present invention generally includes the steps of: (1) grinding the tobacco plant material with a grinding apparatus; (2) placing the ground tobacco plant materials in a stainless steel vessel; (3) adding treated water to the tobacco plant materials to produce a first solution; (4) adjusting the pH of the first solution; (5) adding a first enzyme cocktail to the tobacco plant material/water or first solution to produce a second solution; (6) heating the second solution; (7) adjusting the pH of the second solution; (8) adding a second enzyme cocktail to the second solution to produce a third solution; (9) heating the third solution; (10) adjusting the pH of the third solution; (11) re-heating the third solution; (12) cooling the third solution; (13) transferring the third solution to a process vessel through a titanium filter system having titanium plates to adjust the pH of the third solution; and (14) blending the third solution with a blender having titanium blades. This process produces a dye concentrate. If desired, a quantity of liquid dye can be produced by adding water to the dye concentrate.

In the preferred embodiment of the process of the present invention, the tobacco plant materials are obtained from organically grown tobacco plants. The water is treated prior to mixing with the tobacco plant materials by passing the water through a titanium filtration system to adjust the pH of the water to approximately 7.5. The grinding apparatus grinds the tobacco plant materials to a level of fineness that is selected to produce a desired color and hue of the final dye. Prior to adding the first enzyme cocktail, which comprises plant enzymes pectate lyase and xylanase, the pH of the first solution is adjusted using soda ash or the like. After heating the second solution, the pH of the second solution is adjusted to the desired level using acetic acid or buffers. Once heated and pH adjusted, the second enzyme cocktail, comprising the plant enzyme cellulase, is added to the second solution to produce the third solution. The third solution is then heated and pH adjusted, using soda ash or the like, and then heated. The thirds solution is then cooled and transferred to the process vessel through the titanium filter, which adjusts the pH level of the third solution and converts any undissolved materials in the solution to a neutral state. The third solution is then blended in the blender, which has titanium blades to adjust the pH of the tobacco-based dye concentrate. The juices of the tobacco plants and the added enzymes will break down the leaves and stems, the tobacco plant materials, of the tobacco plants to produce the dye having the desired color, shade and hue. If desired, an additive such as ferrous sulphate can be added to the dye produced by the above process to intensify the color, produce a different shade or hue and to stabilize the dye. Unlike other natural dyes, the dye produced by the process of the present invention does not require the use of a mordant to attach itself to the fibers, textiles and fabrics, whether produced from tobacco plants or other natural or man-made products. Other than not requiring a mordant to set the dye, the dye of the present invention is utilized in substantially the same manner to color fibers, textiles and fabrics. Unlike the process of producing other natural dyes or synthetic dyes, the process of the present invention does not produce any waste material.

Accordingly, the primary aspect of the present invention is to provide a tobacco plant derived dye and a process for making such dyes from tobacco plants that has the various advantages discussed above and which overcomes the disadvantages and limitations associated with prior art dyes and processes for making such dyes.

It is an important aspect of the present invention to provide a process for making dyes and other products from tobacco plants that is accomplished in an efficient, economical and environmentally-friendly manner.

It is also an important aspect of the present invention to provide a tobacco plant derived dye and process for making such dyes, as well as other products, that provides substantial cost and environmental benefits by facilitating and encouraging the use of organically-raised tobacco plants.

It is also an important aspect of the present invention to provide a natural dye that is made from tobacco plants and which can be utilized with a wide variety of textiles, including natural textiles such as wool and cotton and textiles that are made from tobacco plants.

It is also an important aspect of the present invention to provide a tobacco plant derived dye that permanently dyes a textile or fabric, is more resistant to fading than other dyes and does not require a mordant to stabilize the dye and bond it to the textile or fabric.

Yet another important aspect of the present invention is to provide a process that comprises a substantially closed-loop system which utilizes a heated liquid solution to break down tobacco plant materials so as to produce a liquid that can be utilized as a dye.

The above and other aspects and advantages of the present invention are achieved by the present invention. These aspects and advantages are explained in greater detail in the description of the preferred embodiments which follows and by reference to the attached figures. As set forth herein, the present invention resides in the novel features of form, construction, mode of operation and combination of the above presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed text and drawings are merely illustrative of one or more preferred embodiments and, as such, disclose one or more different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, although the figures and description provided herein show certain steps and compounds for the process of producing fiber and dye from tobacco plants, those skilled in the art will readily understand that this is merely for purposes of simplifying this disclosure and that the present invention is not so limited.

Figure 1:
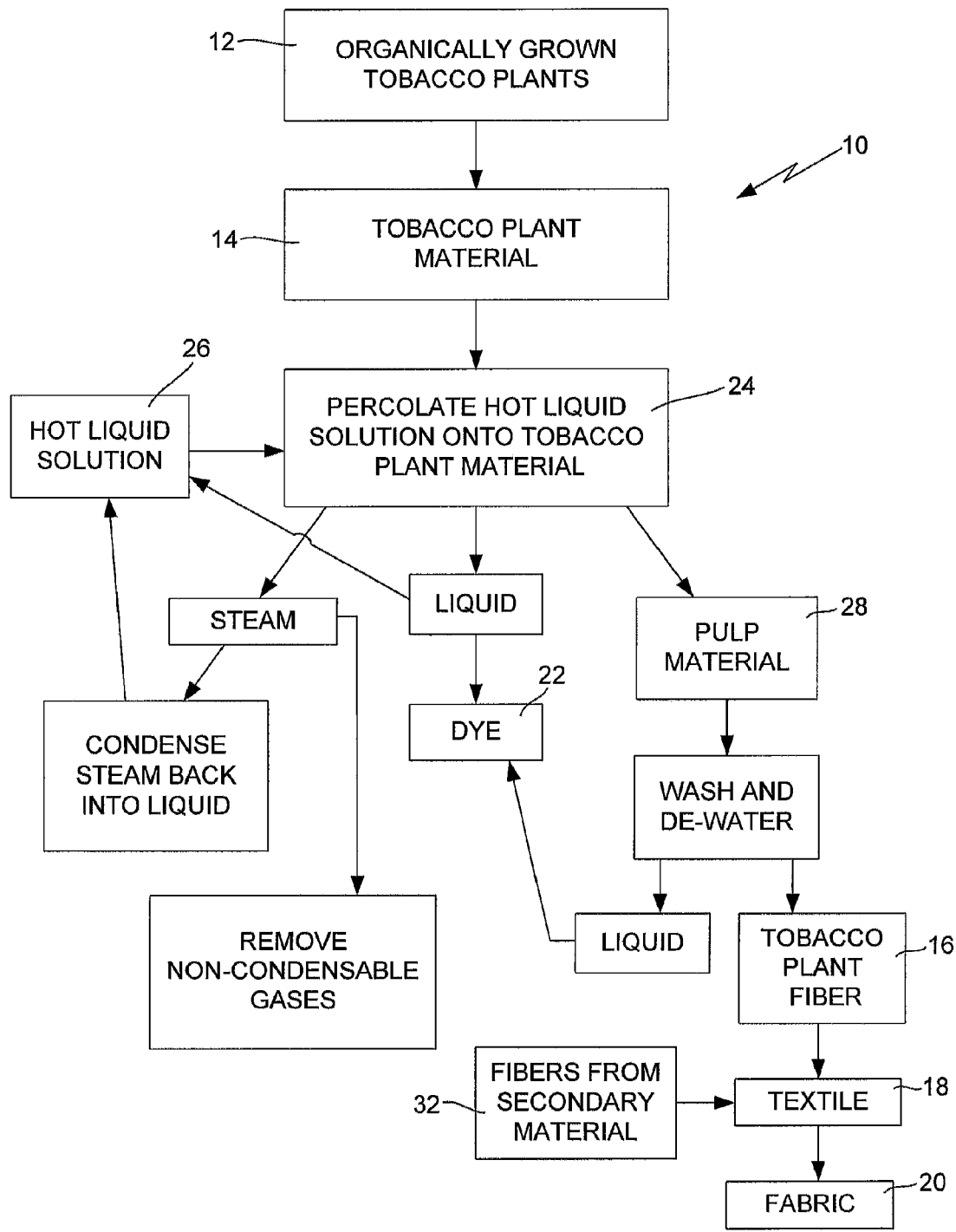
FIG. 1 is a chart summarizing the overall process of deriving a textile and dye from tobacco plants configured according to one embodiment of the present invention.
Figure 2:
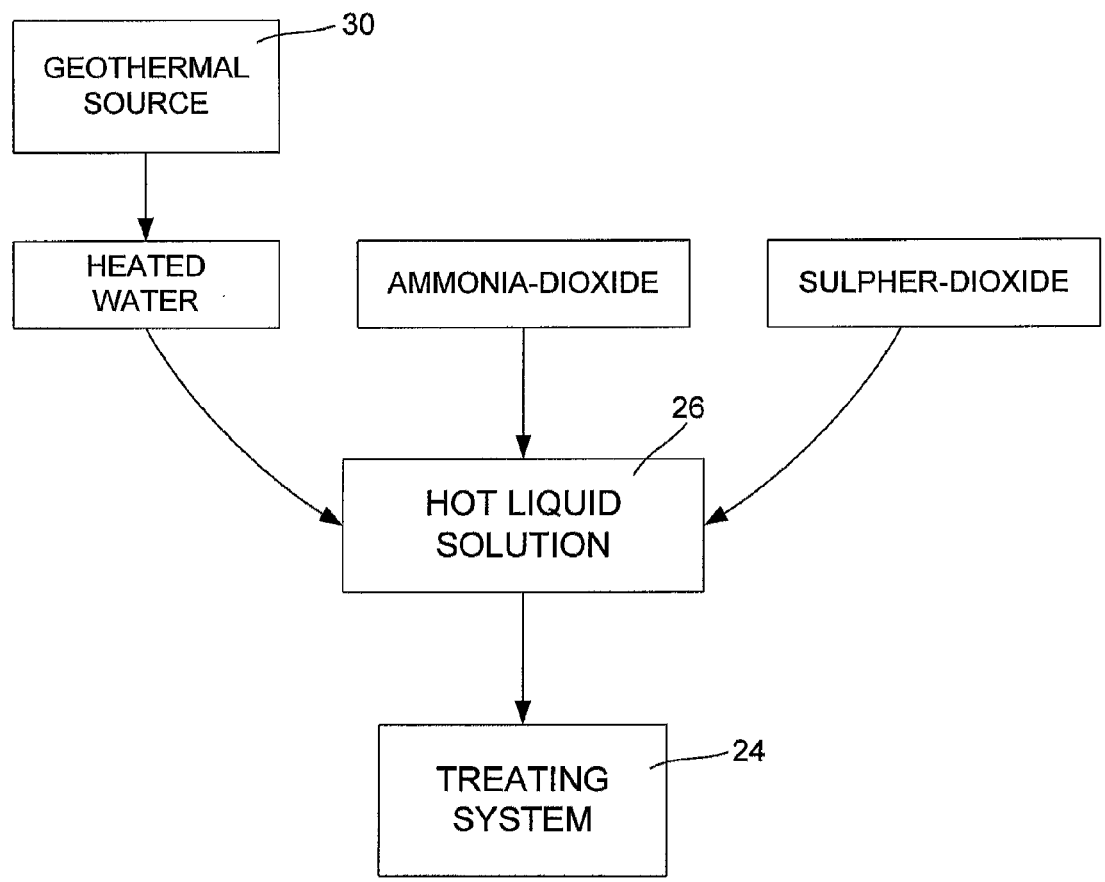
FIG. 2 is a chart summarizing the hot liquid solution utilized in the process summarized in FIG. 1 to produce tobacco plant fibers and a natural dye from tobacco plants.
Figure 3:
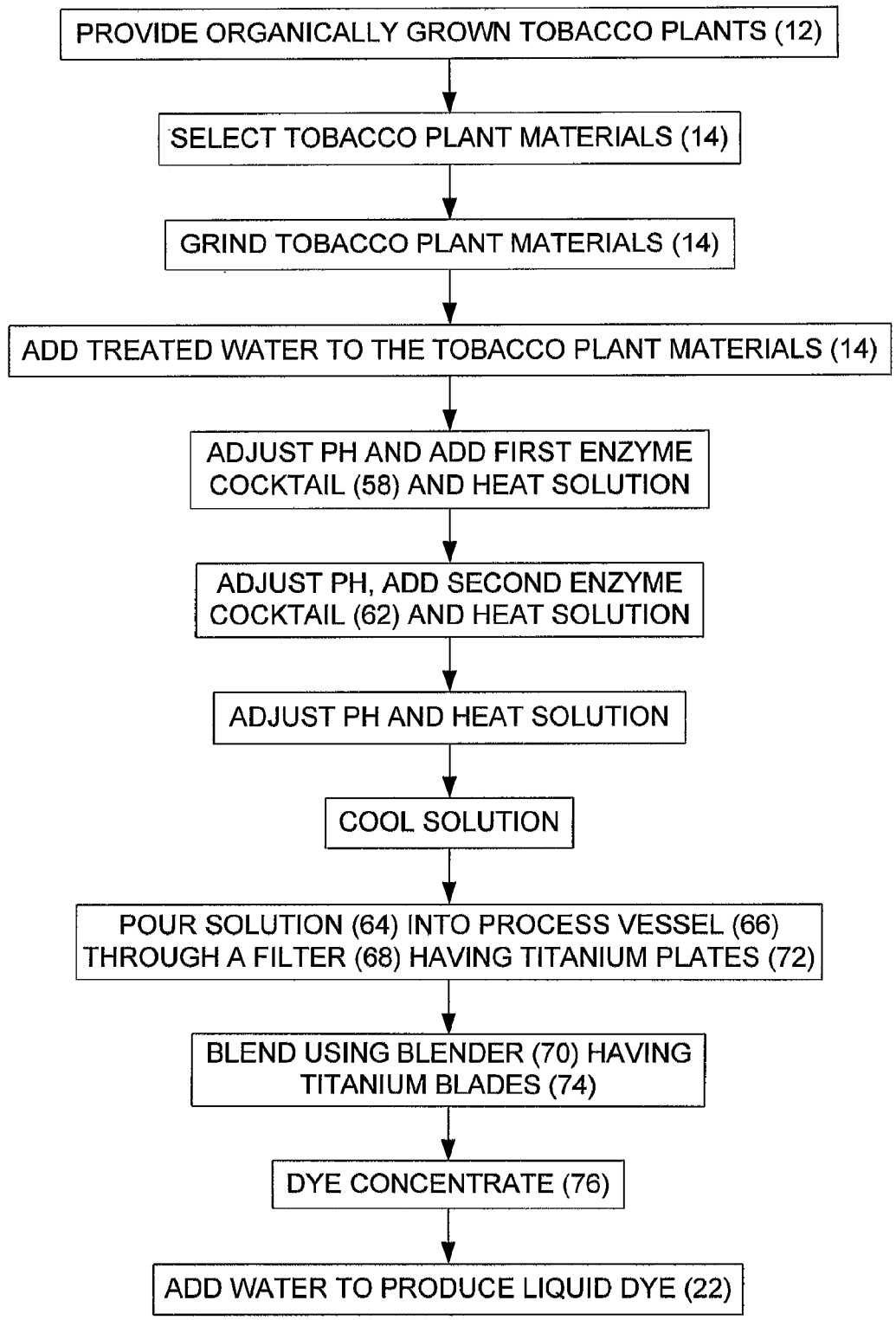
FIG. 3 is a chart that generally summarizes the steps of producing a dye according to the process of the present invention.

A process for producing textiles and dyes from tobacco plants that is configured pursuant to one of the embodiments of the present invention is shown generally as 10 in FIG. 1. A process for producing a dye from tobacco plants that is configured pursuant to the primary embodiment of the present invention is shown generally as 50 in FIG. 3. As set forth in more detail below and summarized in FIGS. 1 and 3, processes 10 and 50 preferably utilize organically grown tobacco plants 12. In the process 10 of FIGS. 1 and 2, the tobacco plants 12 provide the tobacco plant material 14 that is treated to produce tobacco plant fibers 16 which are utilized to form a textile 18 that is processed to form fabric 20 that can be used to make clothing, handbags, bags, rope, covers, bedding and a wide variety of other materials that are commonly made from textiles that have natural and/or synthetic fibers. In a preferred configuration, the process 10 also produces a natural dye 22 and other useful by-products from the tobacco plants 12. In the process 50, tobacco plants 12 are also utilized to produce the natural dye 22. Although tobacco plants 12 grown according to current non-organic methods can be utilized in the processes 10 and 50, organically grown tobacco plants 12 are preferred due to the fact that such tobacco plants 12 do not require the use of chemicals which are typically considered to be potentially harmful to the environment. As shown in FIGS. 1, 2 and 3, the preferred configuration of the processes 10 and 50 of treating the tobacco plants 12, or portions thereof, does not introduce any harmful chemical wastes into the environment that may be configured as a closed-loop system that substantially reuses all of the materials produced by the processes 10/50 that is not selected as an end product thereof (e.g., the textile 18 and dye 22). As set forth in more detail below, the process 10 preserves the various beneficial features of tobacco plants 12 to produce tobacco plant fibers 16 that are utilized in a unique textile 18 which can produce fabrics 20 of exceptional value. Likewise, as also set forth in more detail below, the process 50 of the present invention takes advantage of the various beneficial features of tobacco plants to produce a dye 22 that can be utilized to color a wide variety of fibers, textiles and fabrics without the use of a mordant.

The process 10 utilizes a procedure the inventor generally refers to as "bio-degumming" to take advantage of the unique properties of the various available varieties of tobacco plants 12 to breakdown the fibers 16 thereof in an environmentally non-impact manner that results in little damage to the fibers 16 produced by the process 10. The bio-degumming of process 10 does not utilize or result in the harmful chemicals and other waste products that are typically used or associated with breaking down the pectin during the standard decortification procedure used to separate the bast fibers from the woody core of plants. In addition, the process 10 includes a method of bio-digestion that uses the whole plant, including the stem and leaves, in an anaerobe environment to breakdown all elements of the fiber, stem and leaf into the desired useful fibers 12 and dye 22. When the bio-digestion is stopped at the correct time, which is likely to vary with different varieties of tobacco plants 12, the tobacco leaves, stems and waste fiber are in the desired condition, without loss of strength and feeling brittle (which can occur with other processes and/or plants). In addition to not requiring any additional chemicals, enzymes or other auxiliary materials, the process 10 does not compromise the natural color, aroma and fragrance of the tobacco plants 12, which are then beneficially utilized in the textiles 18 and fabrics 20 produced by process 10. The natural liquor produced by the non-invasive process 10 allows the tobacco plant fiber 16 and dye 22 to be unique for processing into the desired textile 18.

As stated above, a preferred embodiment of the process 10 utilizes organically grown tobacco plants 12 as the source of the plant materials 14 that is converted to the textile 18, dye 22 and any other products. The organically grown tobacco plants 12 for use with process 10 can produce abundant crops, including leaf and stem fiber plant materials, without the use of pesticides, herbicides or defoliants due to the fact that tobacco plants 12 will be grown for the dedicated purpose of being utilized by the process 10 to produce textiles 18 and dyes 22 instead of being grown for smoking, chewing and like tobacco products. One benefit of utilizing tobacco plants 12 for fiber instead of wood chips is that the stem, leaves and other plant material of the tobacco plant 12 has twice as much cellulose and fiber per unit weight. A benefit of utilizing organically grown tobacco plants 12 is that the use of tobacco plant fibers 16 therefrom would be an environmentally-friendly alternative to synthetic petroleum-based fibers and wood pulp. Overall, as will be readily appreciated by those skilled in the art, process 10 benefits human health and the environment and lowers the usage of water and energy to produce the same type of products.

Although a wide variety of tobacco plant varieties may be utilized for the process 10 of the present invention, the *Burley, Virginia, Oriental* and *Basma* varieties are believed to be most suited for being grown organically, e.g. with no herbicides, pesticides or other chemicals, for the process 10. Preferably, only natural insects would be used to control pests. Because the process 10 of the present invention utilizes the entire tobacco plant 12, including stems and leaves, the process 10 effectively allows the entire tobacco plant 12 to be biodegradable. Other benefits of the process 10, particularly with regard to facilitating the use of organically grown tobacco plants, is that it will result in higher overall yield, lower production costs, lower capital costs and far less pollution, energy consumption and water usage. Because the tobacco is not cured for the process 10, there will be a further reduction in energy usage and much less need for wood, thereby reducing the impact on the environment, particularly the soil and air. Presently, it is believed there is very little, if any, tobacco plants 12 that are grown in an organic, environmentally-friendly manner.

As stated above, preferably the process 10 of the present invention is configured to be a closed-loop system, as best shown in FIG. 1. Because the tobacco plants 12 are more plant-like than tree fiber, toxic chemicals are not required to break down the tobacco plant 12 into a pulp or fiber-like pulp that can be utilized to form the tobacco plant fibers 16 for the textile 18 of the present invention. Instead, the process 10 of the present invention utilizes the natural chemicals in the tobacco plant 12 to break down the tobacco plant material 14 to obtain the desired fibers 16. Basically, as set forth below, the tobacco plant materials 14 stew in their own juice for a sufficient amount of time, which is likely to depend on the variety of tobacco plant 12, to produce the tobacco plant fibers 16. Although individual components of the tobacco plant 12 can be utilized in the process 10 of the present invention, the preferred configuration of the process 10 utilizes the entire tobacco plant 12 to increase fiber product, improve efficiency and reduce waste. As also stated above, process 10 is believed to be applicable to all varieties of tobacco plants 12. In addition to providing tobacco plant fiber 16 that is used for textiles 18, which can be made into a variety of fabrics 20, the process 10 also produces a natural dye 22 that, as shown in FIG. 1, can be utilized with the tobacco plant-derived textile 18 (or the textile 18 can be the natural color of the tobacco plant fiber 16) and with other textiles. As set forth in more detail below, the dye 22 produced by the process 10 is permanent, is more resistant to fading and does not require a mordant to stabilize the dye and bond it to the textile 18 or any other textile.

The process 10 of the present invention, best summarized in FIG. 1, preferably comprises a treating system 24 that applies a heated liquid solution 26 to the tobacco plant material 14 to interact with the plant materials 14 so they will stew in their own juices and break down the plant materials 14 into the tobacco plant fiber 16 and dye 22. Preferably, the treating system 24 is a closed-loop system. Water in the closed-loop treating system 24 will be reused to treat the plant material 14 or used to produce the dye 22. The tobacco plants 12, which are preferably organically grown, are harvested to obtain the tobacco plant materials 14 that will be utilized in the process 10. In contrast to normal tobacco harvesting, the entire tobacco plant 12 is harvested from the field, significantly simplifying the harvesting process. In fact, under certain circumstances, it may be beneficial, for various reasons, to harvest the tobacco plants 12 by hand instead of utilizing machinery to reduce fuel consumption and the pollution that is associated with mechanical harvesting. Once harvested, the tobacco plant materials 14 are placed inside the closed-loop treating system 24 and a hot liquid solution 26 is applied to these tobacco plant materials 14. In one embodiment, the ratio of hot liquid solution 26 to tobacco plant materials 14 is approximately 4.5% by weight, with the hot liquid solution 26 at a temperature of approximately 170° F. and applied for approximately 180 minutes, as necessary to sufficiently soften the tobacco plant materials 14. Some varieties of tobacco plants 12, may require a higher or lower liquid temperature and/or a shorter or longer exposure time period. Typically, the hot liquid solution 26 will break down the tobacco plant materials 14 and result in a breakdown of approximately 55% of the weight of the tobacco plant materials 14, which is approximately 12.8% to 17% higher material remaining than wood pulp or linen.

The application of the hot liquid solution 26 to the tobacco plant material 14 produces steam that significantly aids in the necessary breakdown of the tobacco plant material 14. The steam also sets the dye liquor of dye 22 as a permanent solution that does not require the use of heavy metals or salts. In the preferred embodiment, the hot liquid solution 26 is achieved by heating water in an environmentally-friendly manner, such as using a geothermal source 28 (as shown in FIG. 2), solar energy or other such sources. As also shown in FIG. 2, in a preferred embodiment, the hot liquid solution 26 comprises heated water, ammonia-dioxide and sulphur-dioxide, which are mixed into solution and applied to the tobacco plant material 14 in the treating system 24. Experimentation by the inventor has found that this combination creates a chemical reaction with the tobacco plant material 14 that beneficially breaks down the tobacco plant material 14 into the desired pulp material 30, which is then used to make tobacco plant fiber 16, and produces a high quality, useful dye 22 without creating the various environmental issues associated with other fiber processes. As will be readily appreciated by persons skilled in the art, the water used in the hot liquid solution 26 of process 10 should be clean and not contain any chemicals, such as chlorine or the like.

In the preferred embodiment, the hot liquid solution 26 is applied to the tobacco plant material 14 utilizing a drip percolation process, which has been found to sufficiently soften the tobacco plant material 14, including the leaves, into the desired tobacco plant fiber 16. Application of the percolating hot liquid solution 26 onto the tobacco plant material 14 converts the material 14 to fiber 16 and produces steam, which breaks down stalk portion of the tobacco plants 12. For use as a textile 18, the pulp material 30 is removed while still in a fibrous stage. For use to make paper, the pulp material 30 is as soft (e.g., near-liquid form) as possible to produce the desired thin fiber 16. The pulp material is then washed and dewatered to produce the tobacco plant fiber 16 that is used to form the textile 18. The textile is then processed into the desired fabric 20 by spinning, weaving, knitting, crocheting, bonding, pressing or by other known processes or combinations thereof as applicable for the fabric 20. Among other products, the textile 18 can be utilized to form yarn, thread, fleece or the like. As shown in FIG. 1, the steam that is produced in treating system 24 is condensed back into liquid and directed back into the hot liquid solution 26 and any non-condensable gases are dissipated. By recycling and reusing materials and utilizing the entire tobacco plant, the closed, integrated environment of the treating system 24 reduces or substantially eliminates any pollution from the process 10.

The fiber 16 produced by the process 10 invention has been found by the present inventor to have an innate aroma that impregnates the fiber 16 and a fragrance that fully penetrates the fiber 16, which is in contrast to other natural and synthetic fibers. The fragrance, which smells good, is subtle, yet somewhat complex. In addition, further contrasting with other fiber materials, the fragrance is retained by the fiber 16 of the present invention for a very long time and has been found to, in effect, regenerate itself with mild washing. The oils produced in the process 10 and imbedded in the fibers 16 naturally softens the fabric 20, significantly reducing the need for other chemical products to soften the clothes or other items made from fabric 20. The resulting fiber 16 is strong, yet soft and rather luxurious with a natural uncompromising sheen. The fiber 16 looks and feels like fine silk, yet it can be spun into bulky yarn for outerwear used with outdoor fabrics. The colors created of the fabric 20 resulting from fiber 16 produced by the process 10 is a natural, unique color that is saturated into the fiber 16 and lasts through many washings, making the fabric 20 highly valuable without compromising the fiber 16.

As also summarized in FIG. 1, some of the excess liquid that is applied to the tobacco plant material 14 in the treating system 24 is returned in the process 10 to be reused in the hot liquid solution 26. The remaining portion of the liquid, particularly that which is removed during the de-watering of the pulp material 28 is utilized to produce the dye 22. In effect, the process 10 creates its own dye 22 that can be utilized to dye the textile 18 which is produced from the tobacco plant fiber 16 and/or other textiles (e.g., those that are not produced by the process 10). One particular advantage of the dye 22 that is produced by the process 10 is that it does not require a mordant to saturate the textile 18 or other textiles. Instead, the dye 22 permanently attaches itself to a textile, including textile 18, to effectively become part of the textile 18, as opposed to other dyes that do not attach themselves to the fibers and, therefore, require a mordant to dye textile 18. This feature, which is unique to tobacco plants 12, substantially allows full utilization of as much of the tobacco plant 12 as possible in a single process, namely the process 10. The elimination of the need for the mordant to set the dye 22 reduces the requirement for additional chemicals and, as such, provides a number of environmental benefits.

As stated above, the dye 22 that is produced by the process 10 can be utilized to color the textile 18 produced from the tobacco plant fiber 16, other textiles and/or blends of the textile 18 and other textiles. For purposes of the present embodiment, the fibers that are utilized to produce other textiles are referred to as secondary material fibers 32, as shown in FIG. 1. Secondary material fibers 32 may be natural fibers, such as those obtained from animal, plant or mineral sources (including wool and cotton), and synthetic fibers, such as nylon, polyester, acrylic and the like, or a combination of natural and synthetic fibers. The availability, desirability and beneficial uses of the various secondary material fibers 32 are generally well known in the art. As shown in FIG. 1, the secondary material fibers 32 can be mixed with the tobacco plant fiber 16 to produce the desired textile 18 having properties of the combined fiber. The dye 22 produced by process 10 has a wide range of available color hues, estimated to be 50 or more color hues, ranging from pale to intense colors. The color of the dye 22 is primarily affected by the variety of tobacco plant 12 and the stage of growth the tobacco plant 12 is at when it is harvested.

The uses for the fiber 16, textile 18 and dye 22 made from tobacco plants 12 are virtually unlimited. The ability of fiber 16, derived from the process 10, to be utilized for a wide variety of different products will create a new market for tobacco plants 12 and encourage the tobacco plants 12 to be organically grown, providing a new, environmentally-friendly use for a plant that is now considered by many to be toxic and not beneficial to society. In fact, the process 10 could be utilized to support a completely sustainable economy from the farm to the factory, which will be beneficial for local employment, while leaving a very small "footprint" on the region or regions where the tobacco plants 12 are growing and being processed into fiber 16. Unlike presently available means of producing fiber, the process 10 produces fiber 16 by utilizing virtually the entire tobacco plant 12 without the use of toxic chemicals that are discharged to or disposed in the environment.

With regard to the process 50 of the present invention, the preferred embodiment thereof utilizes organically grown tobacco plants 12 as the source of the tobacco plant materials 14 that are converted to dye 22. Organically grown tobacco plants 12 for use with process 50 can produce abundant crops, including leaf and stem materials, without the use of pesticides, herbicides or defoliants due to the fact that the tobacco plants 12 will be grown for the dedicated purpose of being utilized by the process 50 to produce dyes 22 instead of being grown for the normal smoking, chewing and like tobacco products. As set forth above, one benefit of utilizing organically grown tobacco plants 12 to produce dye 22 is that the use of such tobacco plants 12 would be a significant environmentally-friendly alternative to synthetically produced dyes. Other benefits of the process 50 of the present invention to produce dye 22, particularly with regard to facilitating the use of organically grown tobacco plants, is that the process 50 will result in higher overall yield, lower production costs, lower capital costs and far less pollution, energy consumption and water usage. Because the tobacco is not cured for the process 50 of the present invention, there will be a further reduction in energy usage and much less need for wood, thereby further reducing the impact on the environment, particularly the soil and air. Overall, as will be readily appreciated by those skilled in the art, process 50 of the present invention benefits human health and the environment and lowers the amount of water and energy that would otherwise be necessary to produce similar products.

The process 50 of the present invention, summarized with regard to a somewhat specific embodiment in the chart of FIG. 3, generally comprises the steps of: (1) grinding the selected tobacco plant material 14; (2) adding water to the tobacco plant materials 14; (3) processing the tobacco plant material/water solution by adjusting the pH of the solution, heating the solution, adding enzymes to the solution and then heating the solution again; (4) additional processing of the solution by adjusting its pH, adding other enzymes to the solution and heating the solution; (5) adjusting the pH of the solution, heating the solution and then cooling the solution; (6) filtering the enzyme treated solution with a filter having titanium plates; and (7) blending the solution with a blender having titanium blades. The process 50 summarized above produces a concentrate form of dye 22, which may be further processed by adding water to obtain liquid dye 22.

Figure 4:
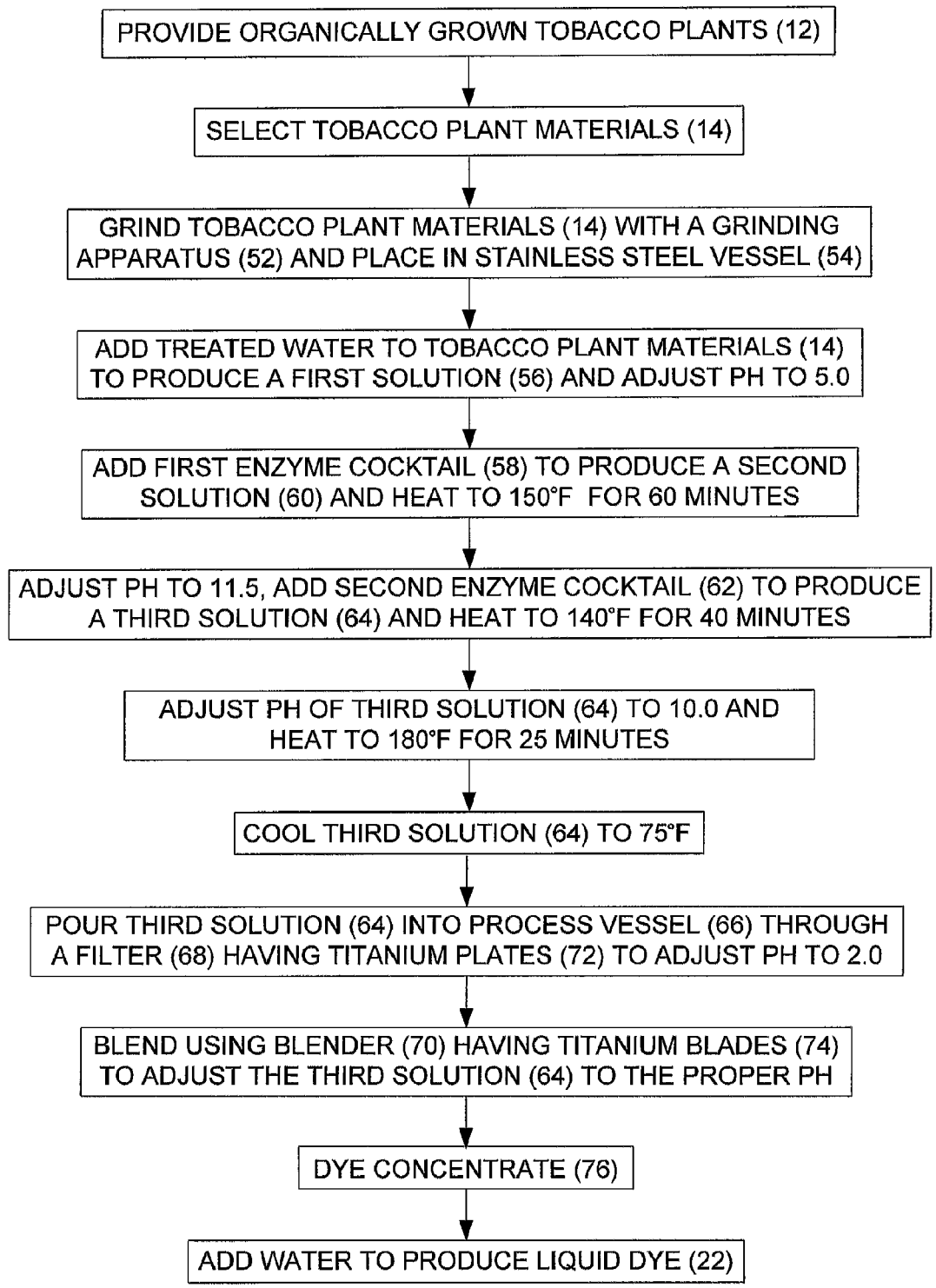
FIG. 4 is a chart that summarizes the steps of producing a dye according to one embodiment of the process of the present invention.

More specifically, the process 50 of the present invention, which is set forth in the chart of FIG. 4, includes the steps of: (1) grinding tobacco plant material 14 with a grinding apparatus 52; (2) placing the tobacco plant material 14 in a stainless steel vessel 54; (3) adding pH-treated water to the tobacco plant materials 14 to produce a first solution 56; (4) adjusting the pH of first solution 56; (5) adding a first enzyme cocktail 58 to the first solution 56 to produce a second solution 60; (6) heating second solution 60; (7) adjusting the pH of the second solution 60; (8) adding a second enzyme cocktail 62 to second solution 60 to produce a third solution 64; (9) heating the third solution 64; (10) adjusting the pH of the third solution 64; (11) heating the third solution 64; (12) cooling the third solution 64; (13) transferring the third solution 64 to a process vessel 66 through a filter 68 having titanium plates 72; and (14) blending the third solution 64 with a blender 70 having titanium blades 74. As will be readily appreciated by those skilled in the art, the process 50 set forth above produces a dye concentrate 76 that can be processed into a liquid dye 22 by adding water thereto.

The stainless steel vessel 54 is utilized to process the tobacco plant materials 14 that are derived from the green and/or dried tobacco plant waste. In the process 50 of the present invention, the tobacco plant materials 14 that are utilized to produce dye 22, which is initially in the form of dye concentrate 76, are the leaves and stem portions of the tobacco plants 12, which in the preferred embodiment of the process 50 of the present invention are organically grown (for the benefits described above with regard to process 10). Unlike process 10, the stalk of the tobacco plants 12 are not utilized in process 50. Because the stalks are not utilized to produce the dye 22 in process 50, it is not necessary to, in effect, steam explode the stalks in order to obtain the pulp material 28 that becomes the tobacco plant fiber 16 (as shown in FIG. 1). The use of green versus dried tobacco plant materials 14 will affect, along with the variety of the tobacco plants 13, the color of the dye 22 produced by the process 50 of the present invention. As set forth above, the process vessel 66 has a filter 68 that is associated therewith which has titanium plates 72 that adjust the pH of the third solution 64 to a pH level of approximately 2.0. This use of the titanium plates 72 in the filter 68 also converts any undissolved materials that may be in the tobacco plant materials 14 (e.g., non-tobacco plant materials) to a neutral state, meaning to non-reactive materials having a pH of approximately 8.0.

Once the tobacco plant materials 14 are selected and separated out from the tobacco plants 12, the grinding apparatus 52 grinds the tobacco plant materials 14 to a fineness level which is chosen based on the intensity of the color that is needed for desired shades and hues. In addition to depending on the fineness (or lack thereof) of the tobacco plant materials 14, the color and hues of the resulting dye will be affected by the variety of the tobacco plants 12 and when in their growth stages the tobacco plants 12 were harvested. The inventor has achieved up to thirty-five colors for the dye 22 with approximately thirty shades of each color having been created, including a variety of hues. As will be readily appreciated by those skilled in the art, a variety of grinding apparatuses 52 can be utilized with the process 50 of the present invention to provide the desired fineness of the ground tobacco plant materials 14. In one configuration, the grinding apparatus 52 has titanium blades. Although the tobacco plant materials 14 may be ground while in the stainless steel vessel 54, preferably they are ground outside the vessel 54 and then transferred to inside the vessel 54 for further processing. The use of a stainless steel vessel 54 is preferred due to the known qualities of such vessels for process 50, namely the vessel 54 will be easy to clean and will not absorb materials so as to reduce the likelihood of any cross-contamination.

Once the tobacco plant materials 14 are ground and placed in the stainless steel vessel 54, if not already there, then water is added to the ground tobacco plant materials 14, as the wetting solution, to produce a first solution 56. Prior to mixing with the tobacco plant materials 14, the water is filtered through a titanium filtration system to achieve a pH of approximately 7.5 for the water. In the embodiment of FIG. 4, approximately 15 ml of the treated water is added to approximately 200 grams of ground tobacco plant materials 14. After the water is added, the pH of first solution 56 is adjusted to approximately 5.0, using soda ash as necessary to achieve the desired pH level. Once the pH level is achieved, a first enzyme cocktail 58 is added to the first solution 56 to produce a second solution 60. The first enzyme cocktail 58 comprises a mixture of plant enzymes, namely pectate lyase and xylanase. In the embodiment above, approximately 150 grams of the first enzyme cocktail 58 is added to the first solution 56. The second solution 60 is then heated to approximately 150° F. for sixty minutes in stainless steel vessel 54. Once heated, the pH of the second solution 60 is adjusted to approximately 11.5 using a material such as acetic acid or buffers. When the second solution 60 is at the desired pH level, a second enzyme cocktail 62 is added to second solution 60 to produce a third solution 64. In the embodiment described above, 250 grams of the second enzyme cocktail 62, which comprises the plant enzyme cellulase, is added to the second solution 60. The third solution 64 is then heated to 140° F. for ninety minutes. After being heated, the pH of the third solution 64 is adjust to approximately 10.0 using soda ash or the like as necessary to achieve the desired pH level. The third solution 64 is heated to 180° F. for twenty-five minutes and then cooled to 75° F.

The cooled third solution 64 is transferred, typically by pouring, to a process vessel 66 through a filter 68 having titanium plates 72 that adjusts the pH level to approximately 2.0, which converts the undissolved materials in the third solution 64 to a neutral state (meaning being non-reactive and having a pH of approximately 8.0). A variable high speed blender 70 having titanium blades 74 is utilized to blend the third solution 64 and adjust the third solution 64 to the desired pH level so as to prepare the tobacco-based dye concentrate 76. As will be readily appreciated by those skilled in the art, the interaction between the third solution 64 and the titanium plates 72 and blades 74 will adjust the pH level of the third solution. Hot water, which may be treated as described above, is added to the dye concentrate 76 to produce liquid dye 22. The volume thereof is stabilized by the pH level and steam is produced. In the above embodiment, the process 50 produces approximately 5.5 pounds of dye concentrate 76, which will produce 2,000 ml of liquid dye 22. As will be readily appreciated by persons skilled in the art, the dye concentrate 76 can be hydrated according to well known processes to produce the liquid dye 22.

As set forth above, the tobacco plant materials 14 will stew in their own juices and the plant enzymes of the first 58 and second 62 enzyme cocktails to break down the tobacco plant materials 14 into dye 22 during the process 50. The tobacco plants 12, which are preferably organically grown, are harvested in a manner that facilitates obtaining the tobacco plant materials 14 therefrom that will be utilized in the process 50 of the present invention. One particular advantage of the dye 22, or the dye concentrate 76, produced by the process 50 of the present invention is that it does not require a mordant to saturate textile 18 or other textiles (e.g., non-tobacco plant textiles). Instead, dye 22 permanently attaches itself to a textile, including textile 18, to effectively become part of the textile 18, as opposed to other dyes that do not attach themselves to the fibers and, therefore, require a mordant to permanently dye the textile 18. A significant advantage of process 50 is that it produces no waste.

With regard to the embodiment set forth in FIG. 4, the process 50 of the present invention includes the steps of: (1) grinding tobacco plant materials 14, namely the leaves and stems, with a grinding apparatus 52 to a desired level of fineness depending on the color and hue desired for dye 22; (2) placing 200 grams of the ground tobacco plant materials 14 in a stainless steel vessel 54; (3) adding 15 ml of treated water to the ground tobacco plant materials 14 to produce a first solution 56; (4) adjusting the pH of first solution 56 to 5.0 using soda ash or the like; (5) adding 150 grams of the first enzyme cocktail 58 to the first solution 56 to produce a second solution 60; (6) heating the second solution 60 to 150° F. for sixty minutes; (7) adjusting the pH of the second solution 60 to 11.5 using acetic acid or buffers; (8) adding 250 grams of the second enzyme cocktail 62 to the second solution 60 to produce a third solution 64; (9) heating the third solution 64 to 140° F. for ninety minutes; (10) adjusting the pH of the third solution 64 to 10.0 using soda ash; (11) heating the third solution 64 to 180° F. for twenty-five minutes; (12) cooling the third solution 64 to 75° F.; (13) transferring the third solution 64 to a process vessel 66 through a filter 68 having titanium plates 72 to adjust the pH level to 2.0; and (14) blending the third solution 64 with a blender 70 having titanium blades 74. The process 50 set forth above produces 5.5 pounds of dye concentrate 76, which can be converted to approximately 2,000 ml of liquid dye 22 by adding hot water to the dye concentrate 76.

As will be readily appreciated by those skilled in the art, the specific volumes and amounts of tobacco plant materials 14, water and enzyme cocktails 58/62 and the specific pH levels, temperatures and processing times set forth in the example above and in FIG. 3 are for exemplary purposes only and are not intended to limit the scope of the present invention. As will be readily appreciated by those skilled in the art, these volumes, amounts, pH levels, temperatures and times will need to be adjusted depending on the quantity of dye 22 desired to be produced and are likely variable depending on the variety of tobacco plants 12 used to produce the dye 22 and the growth stage the tobacco plants 12 were at when harvested for production of dye 22. These and other factors are likely to require the process 50 to be adjusted with regard to the specific quantities, pH and temperature levels and times to achieve the characteristics the user desires for the dye 22.

As stated above, one advantage of the process 50 of the present invention is that it produces no waste. As well known in the art, the process of producing natural dyes generally results in waste materials that must be treated or otherwise processed. The natural dye 22 that is produced by the process 50 of the present invention can be utilized to color the textile 18 produced from the tobacco plant fiber 16, other textiles and/or blends of the textile 18 and other textiles. The dye 22 produced by process 50 has a wide range of available colors and color hues, ranging from pale to intense colors. The color of the dye 22 from process 50 is primarily affected by the fineness to which the selected tobacco plant materials 14, which are the leaves and stems of the tobacco plants 12, are ground, the variety of the tobacco plants 12 used in the process 50 and the stage of growth the tobacco plants 12 were at when harvested. If desired, an additive such as ferrous sulfate or the like, can be added to the dye 22 (including the concentrate 76) to intensify the color and/or to stabilize the dye 22. In use, the dye 22 that is obtained by the process 50 of the present invention is applied to fibers, textiles and fabrics, whether made from tobacco plants 12 and/or other materials, in the same manner as for other natural dyes. Unlike conventional natural dyes, the dye 22 of the present invention does not require use of a mordant to set the dye 22. Once dyed, the color of the final dyed materials will be permanently set.

While there are shown and described herein one or more specific embodiments of the invention, it will be readily apparent to those skilled in the art that the invention is not so limited, but is susceptible to various modifications and rearrangements in design and materials without departing from the spirit and scope of the invention. In particular, it should be noted that the present invention is subject to various modifications with regard to any dimensional relationships set forth herein, with regard to its assembly, size, shape and use and with regard to the materials used in its construction. For instance, there are a number of components described herein that can be replaced with equivalent functioning components to accomplish the objectives of the present invention.

What is claimed is:

1. A process for producing a dye from a tobacco plant, said process comprising the steps of:
   a) selecting one or more tobacco plant materials from said tobacco plant for processing into said dye;
   b) grinding said tobacco plant materials;
   c) adding water to said tobacco plant materials to produce a first solution and adjusting the pH to approximately 5.0;
   d) adding a first enzyme cocktail comprising pectate lyase and xylanase to said first solution to produce a second solution;
   e) heating said second solution and adjusting the pH to approximately 11.5;
   f) adding a second enzyme cocktail comprising cellulase to said second solution to produce a third solution;
   g) heating said third solution and adjusting pH to approximately 10.0;
   h) cooling said third solution; and
   i) adjusting a pH level of said third solution to a pH of approximately 2.0.

2. The process according to claim 1, wherein said adjusting step is accomplished by interacting said third solution with one or more titanium plates.

3. The process according to claim 1 further comprising the step of blending said third solution in a blender.

4. The process according to claim 3, wherein said adjusting step accomplished by interacting said third solution with titanium in or associated with said blender.

5. A process for producing a dye from a tobacco plant, said process comprising the steps of:
   a) selecting one or more tobacco plant materials from said tobacco plant for processing into said dye;
   b) grinding said tobacco plant materials;
   c) adding water to said tobacco plant materials to produce a first solution and adjusting the pH to approximately 5.0;
   d) adding a first enzyme cocktail comprising pectate lyase and xylanase to said first solution to produce a second solution;
   e) heating said second solution and adjusting the pH to approximately 11.5;
   f) adding a second enzyme cocktail comprising cellulase to said second solution to produce a third solution;
   g) heating said third solution and adjusting the pH to approximately 10.0;
   h) cooling said third solution;
   i) transferring said third solution into a process vessel through a filter having one or more titanium plates;
   j) blending said third solution with a blender having one or more titanium blades; and
   k) adjusting a pH level of said third solution by interacting said third solution with said titanium plates and said titanium blades to a pH of approximately 2.0.

* * * * *